(12) United States Patent
Arakawa

(10) Patent No.: US 8,157,333 B2
(45) Date of Patent: Apr. 17, 2012

(54) BRAKING DEVICE

(75) Inventor: Haruo Arakawa, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 302 days.

(21) Appl. No.: 12/683,698

(22) Filed: Jan. 7, 2010

(65) Prior Publication Data

US 2010/0176652 A1 Jul. 15, 2010

(30) Foreign Application Priority Data

Jan. 13, 2009 (JP) ................................. 2009-004920
Sep. 29, 2009 (JP) ................................. 2009-224325

(51) Int. Cl.
*B60T 8/44* (2006.01)
(52) U.S. Cl. ....................... 303/114.1; 60/545
(58) Field of Classification Search ............... 303/114.1, 303/114.3, 115.2; 60/545; 192/12 C, 12 D, 192/12 R, 85.02
See application file for complete search history.

(56) References Cited

U.S. PATENT DOCUMENTS

| 5,236,257 A | * | 8/1993 | Monzaki et al. | ........... 303/114.1 |
| 6,574,959 B2 | * | 6/2003 | Fulks et al. | ...................... 60/545 |
| 2006/0163941 A1 | * | 7/2006 | Von Hayn et al. | ............ 303/155 |
| 2010/0176653 A1 | * | 7/2010 | Arakawa | ........................ 303/10 |

FOREIGN PATENT DOCUMENTS

JP 4088802 B1 5/2008

* cited by examiner

*Primary Examiner* — Christopher Schwartz
(74) *Attorney, Agent, or Firm* — Buchanan Ingersoll & Rooney PC

(57) ABSTRACT

A braking device includes: an input member configured to interlock with a displacement of a brake pedal; an output member which is movable relatively to and independently of the input member and is configured to generate a fluid pressure in a master cylinder; a braking mechanism configured to exert a braking force on a wheel by the fluid pressure generated in the master cylinder; drive means configured to drive the output member independently of the input member; and a clutch mechanism which is provided between the input member and the output member and configured to engage the input member with the output member so as to allow the input and output members to uniformly move when the output member is not driven by the drive means, and to cancel the engagement between the input member and the output member when the output member is driven by the drive means.

9 Claims, 9 Drawing Sheets

BRAKING DEVICE

BACKGROUND OF THE INVENTION

1. Field of the Invention

The present invention relates to a braking device for a vehicle, and particularly to a braking device of a brake-by-wire type using an electronic control.

2. Description of the Related Art

Conventionally, for such a braking device for a vehicle, there has been known a technique of Japanese Patent No. 4088802B. The braking device of Japanese Patent No. 4088802B includes: a motor rotatable in forward and reverse directions; a ball screw linearly-moving mechanism configured to convert a rotation of the nut interlocking with the motor into a linear motion in an axial direction of a bolt whose rotation is restricted; a brake operator linked with an rear end of the bolt so as to push the bolt; and a master cylinder having a master piston whose front end is positioned in a hydraulic chamber to which a wheel brake is connected, and whose rear end is linked with a front end of the bolt. In addition, the nut is rotatable and reciprocative in an axial direction whose retracting limit is set by a housing, and a stroke simulator is provided which is configured to shorten a relative distance between an input transferring member connected to the brake operator and the nut, in accordance with an input from the brake operator. When the nut advances, an elastic member in the stroke simulator advances together with the nut, and a thrust force of the input transferring member becomes transmittable to the bolt, to thereby regulate a stroke and input of the brake operator which would otherwise be consumed by the stroke simulator.

In the braking device of Japanese Patent No. 4088802B, because of the configuration described above, when the motor is actuated, a braking device functions as that of a brake-by-wire type, and when the motor is not actuated due to a failure of the motor or the like, a thrust force of the brake operator can be directly transmitted to the master piston.

However in the braking device of Japanese Patent No. 4088802B, when the motor is actuated, the nut is pressed to the retracting limited by a rotational force of the motor and a force exceeds a pushing force by the input transferring member. Therefore, in the case of a regenerative control or the like, when a torque of the motor is reduced, a force to press the nut to the retracting limit becomes weaker, and a problem may arise that the pushing force by the input transferring member is transmitted to the master piston. In this case, a transmitting force to the master piston cannot be suppressed up to an equivalent level to the pushing force by the input transferring member, and thus a satisfactory regenerative control cannot be performed.

In addition, in a case of a brake operation of an emergency or the like, a time lag may be disadvantageously occurred between the depression of the brake pedal and the actuation of the motor. In this case, after zeroing a gap with a rear end portion of the bolt, the input transferring member directly pushes the bolt until the motor is actuated, to thereby generate a pressure in the master cylinder. Afterward, when the motor is actuated, the nut is pressed to the retracting limit, and as the bolt and the input transferring member move away from each other, a reaction force on the brake pedal is switched from that of the master cylinder to that of the stroke simulator. Therefore, at the time point where the motor is actuated, a magnitude of a reaction force to the brake pedal becomes discontinuous, which brings an uncomfortable feeling to the driver.

Therefore, it would be desirable to provide a braking device as a brake-by-wire type by an electronic control in which even when the electronic control becomes incapable, a braking force can be accurately generated by the operation of the brake pedal.

SUMMARY OF THE INVENTION

In one aspect of the present invention, there is provided a braking device including: an input member configured to interlock with a displacement of a brake pedal; an output member which is movable relatively to and independently of the input member and is configured to generate a fluid pressure in a master cylinder; a braking mechanism configured to exert a braking force on a wheel by the fluid pressure generated in the master cylinder; drive means configured to drive the output member independently of the input member; and a clutch mechanism which is provided between the input member and the output member and configured to engage the input member with the output member so as to allow the input member and the output member to uniformly move when the output member is not driven by the drive means, and to cancel the engagement between the input member and the output member when the output member is driven by the drive means.

According to this configuration, when the output member is driven by the drive means, the engagement between the input member and the output member is cancelled by the clutch mechanism, and a relative movement between the input member and the output member becomes possible. On the other hand, when the output member is not driven by the drive means, the engagement by the clutch mechanism enables a uniform movement of the input member and the output member. Therefore, when the drive means is normally operated, independently of the displacement of the input member, the output member becomes drivable by the drive means (i.e., by-wire control becomes possible). With this configuration, a pushing force by the input member is never transmitted to the master cylinder, and a regenerative control can be satisfactorily performed. In addition, regardless of the operation of the brake pedal, the output member can be driven (i.e., automatic braking control is possible). When the drive means is not actuated due to a failure or the like, or when the actuation of the drive means cannot be momentarily performed in time due to the emergency braking operation or the like, by the output member which moves uniformly through the clutch mechanism with the input member interlocking with the brake pedal, a fluid pressure is generated in the master cylinder in accordance with the displacement of the brake pedal, and thus a braking force can be surely exerted on the wheels.

In one preferable embodiment, the braking device of the present invention further includes: a housing configured to hold the input member and the output member therein, wherein the drive means includes: a motor; a rotational member which is provided in the housing and rotatable while a reciprocation thereof is restricted in accordance with a rotation of the motor; and a linearly-moving member which is engageable with the rotational member, reciprocative in a moving direction of a master piston provided in the master cylinder in accordance with a rotation of the rotational member, and configured to exert a thrust force in an advancing direction of the master piston on the output member.

According to this configuration, a rotational force of the motor can be efficiently converted into a thrust force in an advancing direction of the master cylinder and the thrust force is transmitted to the output member.

In one preferable embodiment of the braking device of the present invention, the clutch mechanism includes: a tapered face formed in an inner face of the output member; a rolling element disposed between the tapered face and an outer face of the input member; a biasing element configured to bias the rolling element in a direction that brings the rolling element into contact with the tapered face and the outer face of the input member; and a link member which is inserted into an opening formed in a side face of the output member, protrudes on both a linearly-moving member side and an input member side, and is swingable so as to press the rolling element in a direction opposite to the direction that brings the rolling element into contact, along with a movement of the linearly-moving member to a master piston side.

According to this configuration, when the linearly-moving member moves on the master piston side due to the brake operation, an end portion of the link member is pressed. Along with this, the link member swings, and an end portion thereof which is opposite to the pressed end portion presses the rolling element in the direction opposite to the direction that brings the rolling element into contact. Accordingly, the clutch mechanism is detached, and a relative movement between the input member and the output member becomes possible. Therefore, when the motor is actuated, the clutch mechanism is detached, and when the motor is not actuated, the clutch engages, and thus regardless of the actuation of the motor, a braking force can be accurately generated.

In one preferable embodiment, the braking device of the present invention further includes a stroke simulator, which is provided in a transmission system configured to transmit an operational force on the brake pedal to the input member, and which is configured to exert a reaction force on the brake pedal in accordance with an operational amount of the brake pedal. With this configuration, during the operation of a by-wire control, an appropriate operational feeling can be imparted to the driver.

In one preferable embodiment of the braking device of the present invention, the linearly-moving member is slightly rotatable by an initial rotation of the motor, the stroke simulator includes: an engaging portion engageable with the housing; and a thrust engaging part thrustwise-engageable with the linearly-moving member, and the engaging portion does not engage with the housing when a current is not applied to the motor, and engages with the housing by a rotational force received from the linearly-moving member through the thrust engaging part when the motor is driven.

According to this configuration, when the motor is actuated, by utilizing the slight rotation of the linearly-moving member, the stroke simulator engages with the housing. On the other hand, when the motor is not actuated, the stroke simulator does not engage with the housing. Therefore, when the motor is not actuated, the stroke simulator advances together with the input member, and never exerts a reaction force to the brake pedal. Therefore to the brake pedal, when a brake-by-wire control is performed, a reaction force from the stroke simulator is transmitted, and when a brake-by-wire control is not performed, a reaction force from the master cylinder is transmitted, and in either cases, an appropriate operational feeling can be imparted to the driver.

In one preferable embodiment, the braking device of the present invention further includes: a second clutch mechanism including: a second tapered face formed in an inner face of a member provided in the housing; a second rolling element disposed between the second tapered face and an outer face of the stroke simulator; and a second biasing element configured to bias the second rolling element in a direction that brings the second rolling element into contact with the second tapered face and the outer face of the stroke simulator; the clutch mechanism being configured to press the second rolling element in a direction opposite to the direction that brings the second rolling element into contact, along with a movement of the linearly-moving member away from the master piston.

According to this configuration, along with the movement of the linearly-moving member, the connection and disconnection between the stroke simulator and the housing are realized by the second clutch mechanism. Accordingly, while making the structure simple, the connection and disconnection between the stroke simulator and the housing in accordance with the driving state of the motor can be surely performed.

Moreover, in such a braking device, it is desired that the stroke simulator moves with a time lag after the brake operation, rather than immediately after. In a case where merely a time lag is present in the actuation of the motor, when the stroke simulator is detached from the housing and advances together with the input member immediately after the brake operation, actuating the motor and performing a brake-by-wire control lead to no reaction force on the brake pedal, and thus an uncomfortable feeling is brought to a driver. In order to solve this problem, in one preferable embodiment of the braking device of the present invention, of two end portions of the biasing element of the clutch mechanism, an end portion opposite to an end portion on a rolling element side is brought into contact with an end wall of the stroke simulator on a master cylinder side.

According to this configuration, since the end wall of the stroke simulator on the master cylinder side is brought into contact with one of two end portions of the biasing element that is opposite to the rolling element, a bias force of the biasing element prevents the stroke simulator from moving immediately after the brake operation. With this configuration, even when the motor is actuated with a time lag after the brake operation, a reaction force can be exerted on the brake pedal, since the stroke simulator engages with the housing.

In one preferable embodiment, the braking device of the present invention further includes a control unit configured to apply a current to the motor required for canceling the engagement of the clutch mechanism when the brake pedal is not operated. According to this configuration, a time lag during the brake operation can be reduced.

DETAILED DESCRIPTION OF THE PREFERRED EMBODIMENT

First Embodiment

Figure 1:
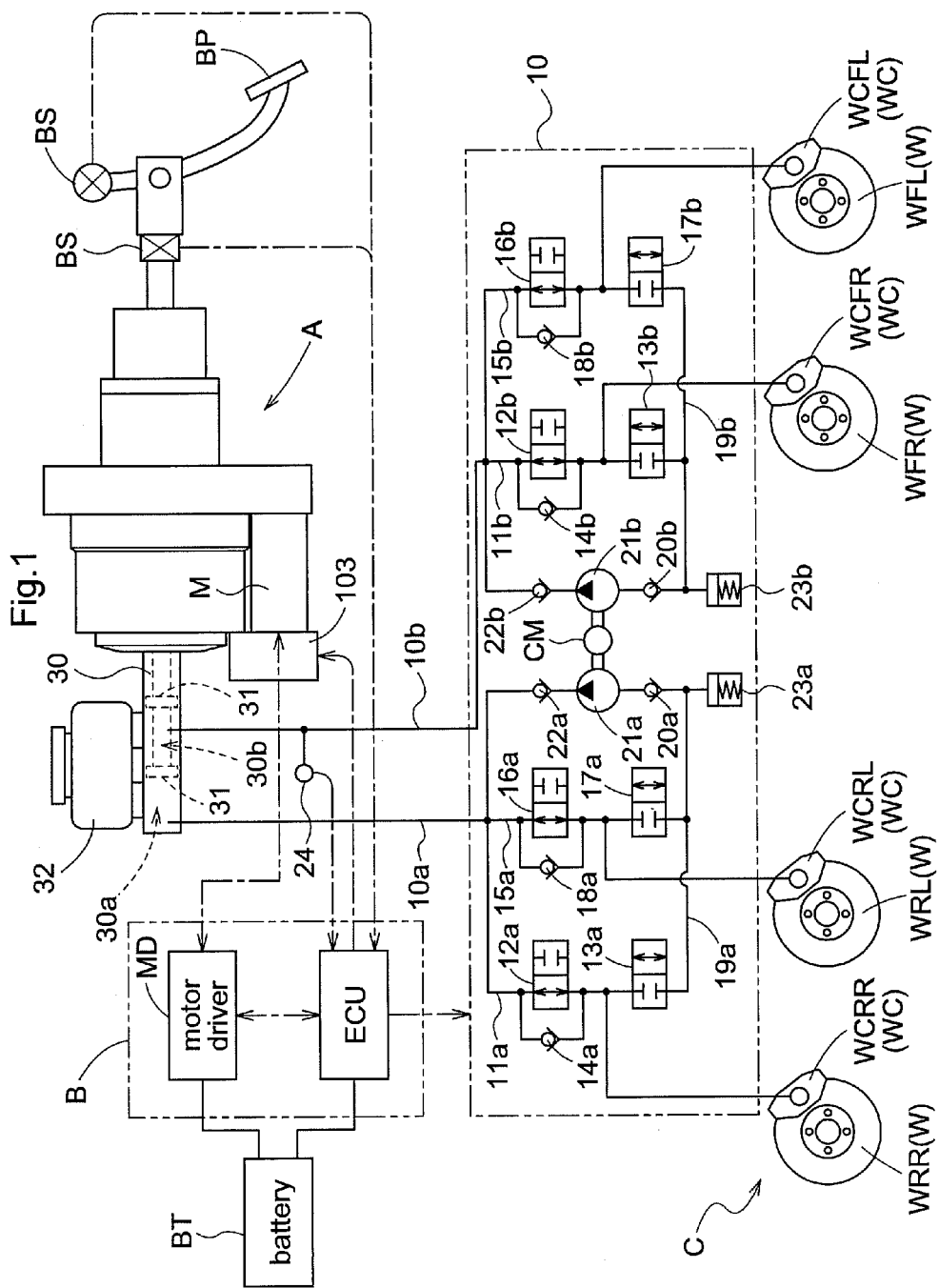
FIG. 1 is a schematic diagram of a braking device of the present invention.

A first embodiment of a braking device of the present invention will be described with reference to the drawings. The braking device of the present invention includes: a brake operation sensor BS configured to measure an operation amount of a brake pedal BP by a driver; a braking mechanism C actuatable configured to be actuated by a fluid pressure and to exert braking forces on wheels W; a hydraulic circuit 10 configured to transmit a fluid pressure to the braking mechanism C; a master cylinder 30 configured to generate a fluid pressure of brake oil in the hydraulic circuit 10; a master reservoir 32 configured to supply the brake oil to the master cylinder 30; a pressurizing mechanism A configured to generate a fluid pressure in the master cylinder 30 in accordance with an operation of the brake pedal BP; and a control unit B configured to apply a current to the pressurizing mechanism A in accordance with a measurement result by the brake operation sensor BS.

The braking mechanism C includes: wheel cylinders WC (WCFR, WCFL, WCRR and WCRL) provided for corresponding wheels W (front right wheel WFR, front left wheel WFL, rear right wheel WRR and rear left wheel WRL, respectively); and brake pads (not shown) each configured to generate a braking force utilizing a frictional force on the corresponding wheel W, by an operational force of the corresponding wheel cylinder WC.

The master cylinder 30 has a master piston 31 reciprocatively held therein. A reciprocating motion of the master piston 31 generates a fluid pressure of the brake oil in the hydraulic circuit 10. In the present embodiment, the master cylinder 30 is in a configuration of what is called a "tandem" type, and includes a first hydraulic chamber 30a and a second hydraulic chamber 30b. The master reservoir 32 has two fluid passages, each independently communicating with the first hydraulic chamber 30a and the second hydraulic chamber 30b.

The hydraulic circuit 10 includes a first hydraulic circuit 10a and a second hydraulic circuit 10b which are connected to the master cylinder 30. The first hydraulic circuit 10a connects the first hydraulic chamber 30a to the rear right wheel cylinder WCRR and the rear left wheel cylinder WCRL. The second hydraulic circuit 10b connects the second hydraulic chamber 30b to the front right wheel cylinder WCFR and the front left wheel cylinder WCFL.

The first hydraulic circuit 10a branches into a first branch passage 11a and a second branch passage 15a, which are connected to the rear right wheel cylinder WCRR and the rear left wheel cylinder WCRL, respectively. On the first branch passage 11a, a first normally-opened control valve 12a is disposed that is normally-opened and switchable between a communicating position and a shutoff position. At a juxtaposed position to the position of the first normally-opened control valve 12a, a first check valve 14a is disposed that allows a flow of a brake fluid from a rear right wheel cylinder WCRR side to a pressurizing mechanism A side, but blocks a flow in a reverse direction. Like the first branch passage 11a, on the second branch passage 15a, a second normally-opened control valve 16a is disposed that is normally-opened and switchable between a communicating position and a shutoff position, and at a juxtaposed position to the position of the second normally-opened control valve 16a, a second check valve 18a is disposed that allows a flow of the brake fluid from a rear left wheel cylinder WCRL side to the pressurizing mechanism A side, but blocks a flow in a reverse direction.

There is provided a merging passage 19a which merges a fluid passage portion branched from the first branch passage 11a on the rear right wheel cylinder WCRR side relative to the first normally-opened control valve 12a with a fluid passage portion branched from the second branch passage 15a on the rear left wheel cylinder WCRL side relative to the second normally-opened control valve 16a. The merging passage 19a is then connected to a branching point into the first branch passage 11a and the second branch passage 15a. In addition, on the portion of the merging passage 19a branched from the first branch passage 11a, a first normally-closed control valve 13a is disposed that is normally-closed and switchable between a communicating position and a shutoff position. Likewise, on the portion of the merging passage 19a branched from the second branch passage 15a, a second normally-closed control valve 17a is disposed that is normally-closed and switchable between a communicating position and a shutoff position. There are disposed a third check valve 20a, a hydraulic pump 21a and a fourth check valve 22a, in this order, on a fluid passage between a merging point on the merging passage 19a where the fluid passage from the first normally-closed control valve 13a meets the fluid passage from the second normally-closed control valve 17a, and the above-mentioned branching point into the first branch passage 11a and the second branch passage 15a. The hydraulic pump 21a is configured to be driven by a motor CM and to discharge the brake fluid. In addition, a reservoir 23a is provided between the first normally-closed control valve 13a as well as the second normally-closed control valve 17a on the merging passage 19a and the third check valve 20a.

The configuration of the first hydraulic circuit 10a in the hydraulic circuit 10 was described above. Since the first hydraulic circuit 10a and the second hydraulic circuit 10b have the same configuration, the second hydraulic circuit 10b includes the same components as those of the first hydraulic circuit 10a. Accordingly, in the drawing, a letter "a" used in a reference character for indicating the component of the first hydraulic circuit 10a is replaced with a letter "b", for indicating a component of the second hydraulic circuit which is the same as that of the first hydraulic circuit, and thus a duplicate description of the second hydraulic circuit is omitted. Hereinafter, unless the first and second hydraulic circuits should be distinguished, the letter "a" or "b" in the reference character is omitted.

The motor CM is configured to rotatably drive the hydraulic pump 21a in the first hydraulic circuit 10a and a hydraulic pump 21b in the second hydraulic circuit 10b.

In addition, in the second hydraulic circuit 10b is disposed a master cylinder hydraulic sensor 24 configured to measure a fluid pressure of the master cylinder 30.

As shown in FIG. 1, the braking device of the present invention includes the control unit B configured to perform various controls. The control unit B includes: an ECU (electronic control unit) with a microcomputer as a core component; a motor driver MD configured to apply a current to the pressurizing mechanism A; and the like. To the ECU and the motor driver MD, a battery BT for supplying power is connected. The control unit B is, as will be described later, configured to control a motor M, the various control valves in the hydraulic circuit 10 or the like, during a control of a braking force exerted on the wheel W. The braking device according to the present invention is in a configuration of what is called a "brake-by-wire" type. Accordingly, the control unit B is configured to receive an input from the brake operation sensor BS that measured an operation amount of the brake pedal BP, and apply a current to the pressurizing mechanism A in accordance with the operation amount of the brake pedal BP. It should be noted that, in the present embodiment, a stroke amount of the brake pedal BP and a tread force on the brake pedal BP by a driver are used as the operation amount of the brake pedal BP. Accordingly, a stroke sensor and a tread force sensor are used as the brake operation sensor BS.

The control unit B is configured to control a braking force to be exerted on each wheel W, through the following controls. When a braking force is to be exerted on the wheel W, in other words, when a pressure of the wheel cylinder WC is to be increased, the control unit B switches the first normally-opened control valve 12a and the like to the communicating position, and the first normally-closed control valve 13a and the like to the shutoff position. To the contrary, when the braking force of the wheel W is to be reduced, in other words, when the pressure of the wheel cylinder WC is to be decreased, the control unit B switches the first normally-opened control valve 12a and the like to the shutoff position, and the first normally-closed control valve 13a or the like to the communicating position. When the braking force of the wheel W is to be retained, in other words, when the pressure of the wheel cylinder WC is to be retained, the control unit B switches both the first normally-opened control valve 12a and the like and the first normally-closed control valve 13a and the like to the shutoff position.

Figure 2:
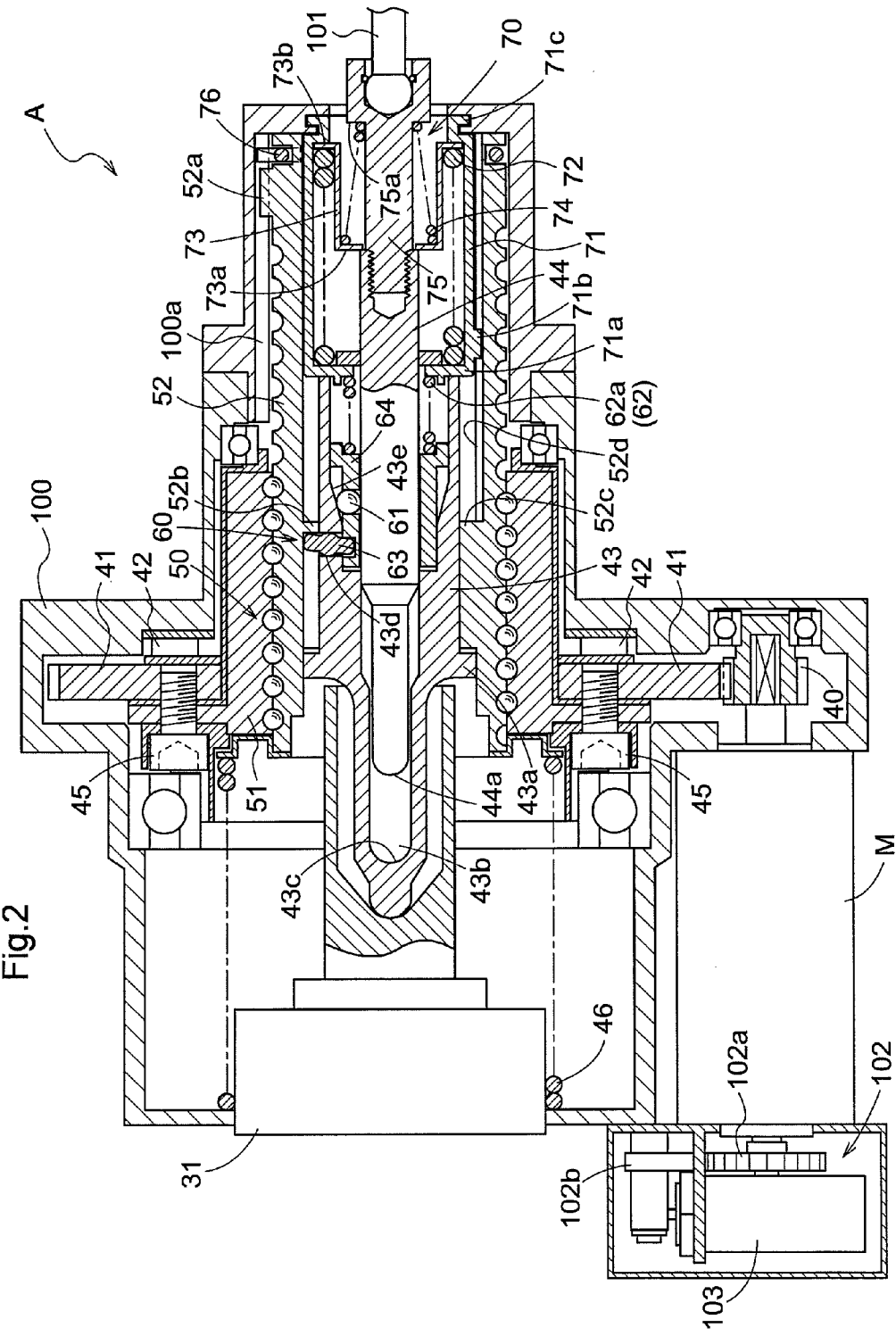
FIG. 2 is a cross section of a pressurizing mechanism not in operation.

FIG. 2 is a diagram showing a configuration of the pressurizing mechanism A in the braking device of the present invention. The pressurizing mechanism A includes: the motor M rotatable in accordance with an applied current from the control unit B; a small spur gear 40 rotatable uniformly with a rotary shaft of the motor M; a large spur gear 41 having cogs capable of engaging with cogs of the small spur gear 40, with a cog number of the large spur gear 41 being larger than that of the small spur gear 40; a linear motion conversion mechanism 50 which is provided inside the large spur gear 41, coaxial therewith, and configured to convert a rotation of the large spur gear 41 into a linear motion of the master piston 31 in a reciprocating direction; an output piston 43 which is inserted into the linear motion conversion mechanism 50 and movable in the reciprocating direction of the master piston 31 (this output piston is one embodiment of the output member of the present invention); an input rod 44 which is connected to the brake pedal BP through a shaft 101 and movable in the reciprocating direction of the master piston 31 in accordance with an operation amount of the brake pedal BP (this input rod is one embodiment of the input member of the present invention); a stroke simulator 70 configured to generate a reaction force to the brake pedal BP in accordance with a reciprocation of the input rod 44; and an elastic member 46 configured to bias the linear motion conversion mechanism 50 in a retracting direction of the master piston 31. It should be noted that, in the following descriptions, a directional movement of the master piston 31 during pressurization of the brake oil is referred to as "advancing", and during depressurization is referred to as "retracting". These motions are collectively referred to as "reciprocating".

The linear motion conversion mechanism 50 includes: a rotational member 51 which is coaxially inserted into the large spur gear 41 and rotatable uniformly with the large spur gear 41 while a movement in a reciprocating direction thereof is restricted; and a linearly-moving member 52 which is coaxially inserted into the rotational member 51 and movable in a reciprocating direction. The large spur gear 41 and the rotational member 51 are uniformly fixed to each other by fixing members 45, and along with the rotation of the large spur gear 41, the rotational member 51 uniformly rotates. In addition, the large spur gear 41 is rotatably fixed to a housing 100 through a thrust bearing 42. The linearly-moving member 52 is configured to thrust relative to a rotation regulating part 100a of the housing 100 and engage with the rotation regulating part 100a so as to transmit a rotational force to the rotation regulating part 100a through a thrust engaging part 52a. In the present invention, such an engagement is referred to as "thrustwise-engagement". Moreover, each of an inner wall of the rotational member 51 and an outer wall of the linearly-moving member 52 has a groove configured to screw with each other. Accordingly, as the rotational member 51 rotates, the linearly-moving member 52 begins to rotate. However, since the thrust engaging part 52a is brought into contact with the rotation regulating part 100a, the rotation of the linearly-moving member 52 is restricted, while the linearly-moving member 52 moves in the advancing direction.

Into the linearly-moving member 52, the output piston 43 is coaxially inserted. In addition, inward in a radial direction of the linearly-moving member 52, a thrust transfer part 52c configured to transmit a thrust force in an advancing direction to the output piston 43 is provided. On the other hand, outward in a radial direction of the output piston 43, a thrust receiving part 43a configured to receive the thrust force from the thrust transfer part 52c is provided. As shown in FIG. 2, when they are not actuated, a small gap is provided in the reciprocating direction between the thrust transfer part 52c and the thrust receiving part 43a. When the linearly-moving member 52 advances, the gap is narrowed, and then the thrust transfer part 52c and the thrust receiving part 43a are brought into contact with each other, and then the linearly-moving member 52 and the output piston 43 uniformly advance. In addition, the housing 100 has an opening on a master cylinder 30 side, into which an end portion of the master piston 31 extends. When the output piston 43 advances, the extending end portion of the master piston 31 is pushed, which pressurizes the brake oil inside the master cylinder 30. This fluid pressure is then transmitted to the wheel cylinder WC through the hydraulic circuit 10.

The output piston 43 has a cavity 43b whose end portion on an opposite side to the master cylinder 30 side has an opening, into which the input rod 44 is inserted. As shown in FIG. 2, an end portion 44a of the input rod 44 on the master cylinder 30 side and an end wall 43c of the cavity 43b of the output piston 43 are configured to have a predetermined gap therebetween. In a case of a normal brake operation, as the brake pedal BP is depressed, the input rod 44 advances to the master cylinder 30 side, and at the same time, the output piston 43 advances due to the actuation of the motor M. Accordingly, the end portion 44a of the input rod 44 never pushes the end wall 43c of the cavity 43b of the output piston 43. In other words, the depressing operation of the brake pedal BP is not directly transmitted to the master piston 31, but a force is applied to the master piston 31 by a current applied in accordance with the operation amount of the brake pedal BP. Moreover, the connection and disconnection of the input rod 44 and the output piston 43 are switchable utilizing the clutch mechanism 60 which will be described later. With this configuration, a brake-by-wire is realized.

In the braking device of a brake-by-wire type, when the motor M is normally actuated, the functions thereof can be exerted. However, when the motor M is not actuated due to a failure or the like of the motor M, the function cannot be exerted. Therefore, when the motor M fails to be actuated, the depressing operation of the brake pedal BP should be directly transmitted to the output piston 43. Therefore, the braking device of the present invention has a clutch mechanism 60 as will be explained below.

The clutch mechanism 60 is configured to connect and disconnect the input rod 44 and the output piston 43, in accordance with a driving state of the motor M. As shown in FIGS. 2 and 5, on a side face of the output piston 43, an opening 43$d$ is provided that penetrates from the cavity 43$b$ to an inner wall side of the linearly-moving member 52. The clutch mechanism 60 includes: a tapered face 43$e$ formed in an inner wall of the cavity 43$b$ of the output piston 43; a rolling element 61 disposed between the tapered face 43$e$ and an outer face of the input rod 44; a biasing element 62 configured to bias the rolling element 61 in a direction that brings the rolling element 61 into contact with the tapered face 43$e$ and the outer face of the input rod 44; a link member 63 which is inserted into the opening 43$d$, is supported by the side wall of the output piston 43, protrudes on both a linearly-moving member 52 side and an input rod 44 side, and is swingable in the reciprocating direction; a fixed member 64 which is configured to retain the rolling element 61 and has a recess for engaging an end portion of the link member 63 on the input rod 44 side; and a projection 52$b$ which is provided in the linearly-moving member 52 and configured to press the link member 63 in an advancing direction when the linearly-moving member 52 advances. In addition, an end portion 62$a$ of the biasing element 62 on a stroke simulator 70 side is fixed to an end wall 71$a$ of a first casing 71 of the stroke simulator 70. It should be noted that with respect to each of the rolling element 61 and the link member 63, a plurality thereof are provided in a circumferential direction, and the projection 52$b$ and the fixed member 64 are configured so as to correspond to the number of such components.

Accordingly, when the motor M is actuated, the clutch mechanism 60 disconnects the input rod 44 and the output piston 43 from each other; when the motor M is not actuated, the input rod 44 and the output piston 43 are connected, and uniform advance becomes possible. As a result, when the motor M is actuated, the function of the brake-by-wire is exerted, and when the motor M is not actuated, a tread force on the brake pedal BP can be directly transmitted to the master cylinder 30. It should be noted that details of the operation of the clutch mechanism 60 will be described later.

In the braking device of a brake-by-wire type as described above, even when the brake pedal BP is depressed, no reaction force is given from the master piston 31, which brings an uncomfortable feeling to a driver. Typically, in the braking device of a brake-by-wire type, in order to solve this problem of uncomfortable feeling, a stroke simulator is introduced. The stroke simulator is configured to generate a reaction force in accordance with a stroke of the brake pedal BP, to thereby provide a driver with a feeling of the brake operation.

The stroke simulator 70 of the present invention has a double-layered structure, as shown in FIG. 2. A first elastic member 72 is provided so as to follow an inner wall of the first casing 71 located outside, and the end wall 71$a$ has a hole formed therein for inserting the input rod 44 thereinto. One end portion of the first elastic member 72 is brought into contact with an inner face of the end wall 71$a$ of the first casing 71. A second casing 73 located inside has an end wall 73$a$ having a hole formed therein for inserting a connecting member 75 configured to connect the input rod 44 and the shaft 101, and is provided with a jaw portion 73$b$ with which the other end portion of the first elastic member 72 is brought into contact. The connecting member 75 inserted into the second casing 73 is screwed to the input rod 44, and a thrust force of the advancing shaft 101 is transmitted to the input rod 44. In addition, inside of the second casing 73, a second elastic member 74 is provided, one of whose end portions is brought into contact with an inner face of the end wall 73$a$ of the second casing 73, and the other of whose end portions is brought into contact with a jaw portion 75$a$ of the connecting member 75.

It should be noted that, in the present embodiment, for each of the first elastic member 72 and the second elastic member 74, a coil spring is used, and a spring constant of the second elastic member 74 is set smaller than that of the first elastic member 72. Accordingly, at an initial state of the depression of the brake pedal BP, a smaller reaction force is generated by the second elastic member 74, and afterwards, a larger reaction force is generated by the first elastic member 72. As a result, it becomes possible to generate the same reaction force as that of the conventional disc brake, and thus to prevent an uncomfortable feeling from being brought to a driver.

As described above, in the case of the braking device of a brake-by-wire type, the stroke simulator 70 is for exerting a reaction force on a driver in response to the operation of the brake pedal BP. Therefore, a reaction force generated by the stroke simulator 70 is needed when a function of brake-by-wire is normally operated. However, in the braking device of the present invention, when the motor M is not driven, a tread force on the brake pedal BP is directly transmitted to the master piston 31 as will be described later, and thus the reaction force is transmitted to the brake pedal BP. In this situation, if the stroke simulator 70 generates a reaction force, a driver requires a tread force about twice as much as normal. In order to solve this problem, the braking device of the present invention is configured as follows, so that the stroke simulator 70 is disconnected from the housing 100 when the motor M is not actuated.

Figure 6A:
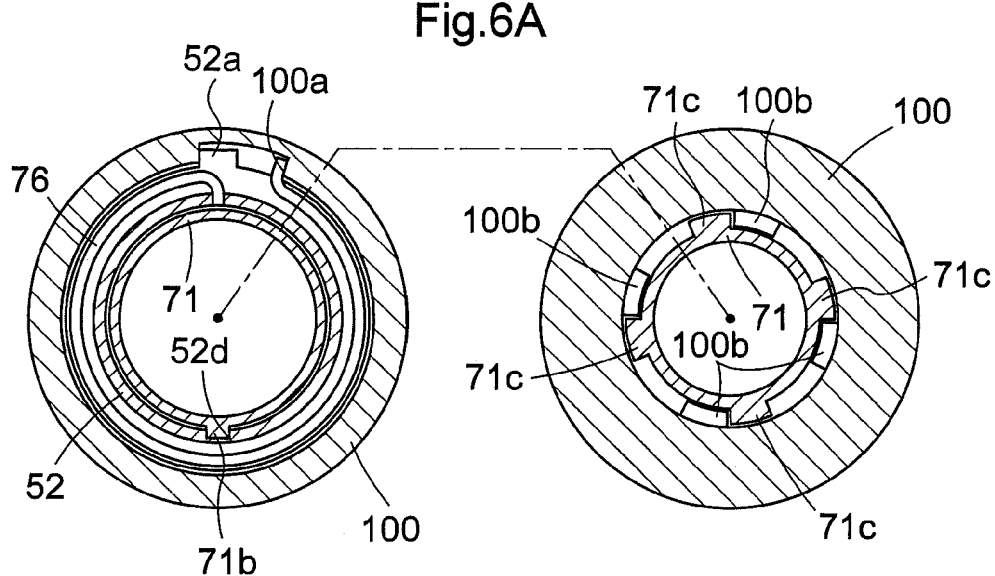
FIG. 6A is a diagram showing an engagement state of a stroke simulator with a housing.
Figure 6B:
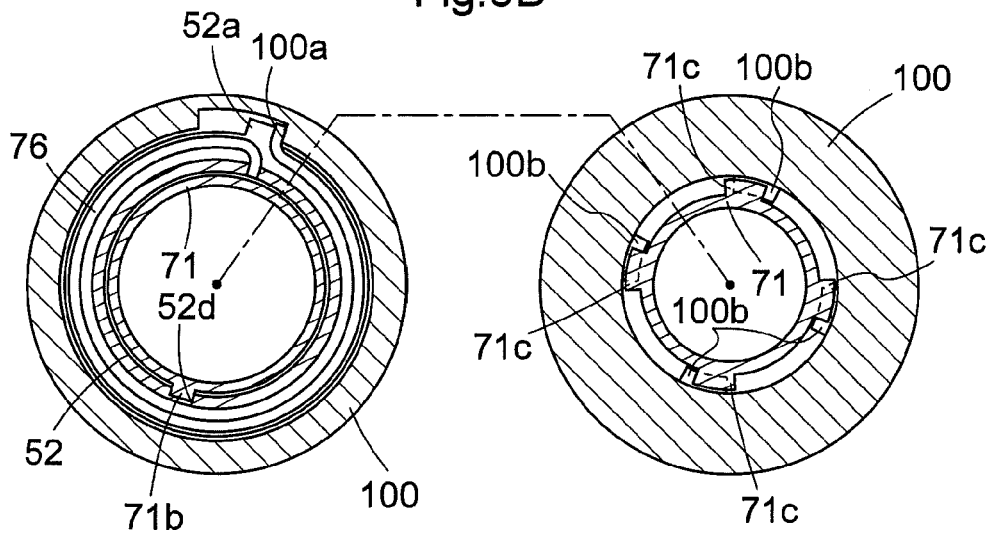
FIG. 6B is a diagram showing an engagement state of a stroke simulator with a housing.

FIGS. 6A and 6B are cross section of the pressurizing mechanism A as seen in an axial direction. As shown in FIG. 2, the first casing 71 is provided with an engaging portion 71$c$ that protrudes outward in a radial direction, and a torsion spring 76 configured to exert a bias force on the first casing 71. In each of FIGS. 6A and 6B, the drawing on the right side is a cross section with a plane passing the engaging portion 71$c$, and the drawing on the left side is a cross section with a plane passing the torsion spring 76. As shown in FIGS. 6A and 6B, the housing 100 has a lock portion 100$b$ configured to engageably lock the engaging portion 71$c$ to thereby restrict the movement of the first casing 71 in the advancing direction. In addition, as shown in FIG. 2, the first casing 71 includes a thrust engaging part 71$b$ which is configured to be brought into contact with a rotational force transfer portion 52$d$ provided in the linearly-moving member 52 and receives a rotational force from the linearly-moving member 52, and thus thrustwise-engages with the linearly-moving member 52.

FIG. 6A shows a state in which the motor M is not actuated. In this case, a bias force in a counterclockwise direction in the drawing is given to the first casing 71 by the torsion spring 76, and the engaging portion 71$c$ and the lock portion 100$b$ are not engaged with each other. Therefore, the first casing 71, and thus the stroke simulator 70, are allowed to move in the advancing direction. When the brake pedal BP is depressed in this situation and the motor M is not actuated, the stroke simulator 70 advances together with the input rod 44, without generating a reaction force. In this situation, since the input rod 44 is connected to the output piston 43 through the clutch mechanism 60 as described above, the output piston 43 advances and pushes the end portion of the master piston 31.

As a result, only a reaction force by the master piston 31 is transmitted to the brake pedal BP.

On the other hand, in a case where the motor M is driven, the linearly-moving member 52 begins to rotate as the rotational member 51 rotates. As shown in FIG. 6B, when the linearly-moving member 52 rotates, the thrust engaging part 52a is brought into contact with the rotation regulating part 100a, by which the rotation of the linearly-moving member 52 is restricted. In this situation, the rotational movement of the linearly-moving member 52 is transmitted from the rotational force transfer portion 52d to the first casing 71 through the thrust engaging part 71b, and a rotational force of the first casing 71 exceeds a bias force of the torsion spring 76, which allows the first casing 71 to rotate. Due to this rotation, the engaging portion 71c and the lock portion 100b engage with each other, to thereby restrict the movement of the first casing 71 in the advancing direction. In this situation, as described above, the clutch mechanism 60 disconnects the input rod 44 and the output piston 43 from each other and they become independently movable, and thus the input rod 44 never receives a reaction force from the output piston 43. Accordingly, only a reaction force from the stroke simulator 70 is transmitted to the brake pedal BP.

As described above, in the braking device of the present invention, the stroke simulator 70 is fixed to the housing 100 when the motor M is actuated, while disconnected from the housing 100 when the motor M is not actuated. To put it another way, the stroke simulator 70 generates a reaction force when the motor M is actuated, while does not generate a reaction force when the motor M is not actuated. As a result, when the motor M is not actuated, a loss in an operational force, which may otherwise be caused by a reaction force of the stroke simulator 70, can be prevented.

In the case of the braking device of a brake-by-wire type, even when the brake pedal BP is not depressed, a braking force can be retained by keeping applying a current to the motor M. However, this type of control is not preferable from a viewpoint of current consumption. Therefore, the braking device of the present invention includes a ratchet 102 configured to restrict a reverse rotation of the motor M so that a braking force is retained even when a current applied to the motor M is stopped. The ratchet 102 is formed of: a gear 102a which is coaxial with the rotary shaft of the motor M and rotatable uniformly with the rotary shaft of the motor M; and a claw 102b engageable with a groove of the gear 102a to restrict a rotation of the gear 102a in the opposite direction of the rotational direction of the motor M. In addition, the claw 102b is swingably supported by a rocking shaft whose axis is oriented in the same direction as the rotary shaft of the motor M. One end of the claw 102b is engageable with the groove of the gear 102a, while the other end is connected to a solenoid 103. The solenoid 103 allows a movable core thereof to reciprocate by a current from the control unit B. When the braking force is desired to be retained, the control unit B applies a current to the solenoid 103 so as to allow the movable core of the solenoid 103 to advance. Along with this, the claw 102b is allowed to swing, and engages with the groove in the gear 102a. Accordingly, a reverse rotation of the gear 102a is restricted, and at the same time, a reverse rotation of the rotary shaft of the motor M is also restricted. When the rotation of the motor M is stopped, a force in a direction that tends to depressurize the master cylinder 30 is generated by a fluid pressure of the master cylinder 30, but the ratchet 102 receives such a force, to thereby retain the fluid pressure of the master cylinder 30.

[Operation when the Motor is Normally Actuated]

Figure 3:
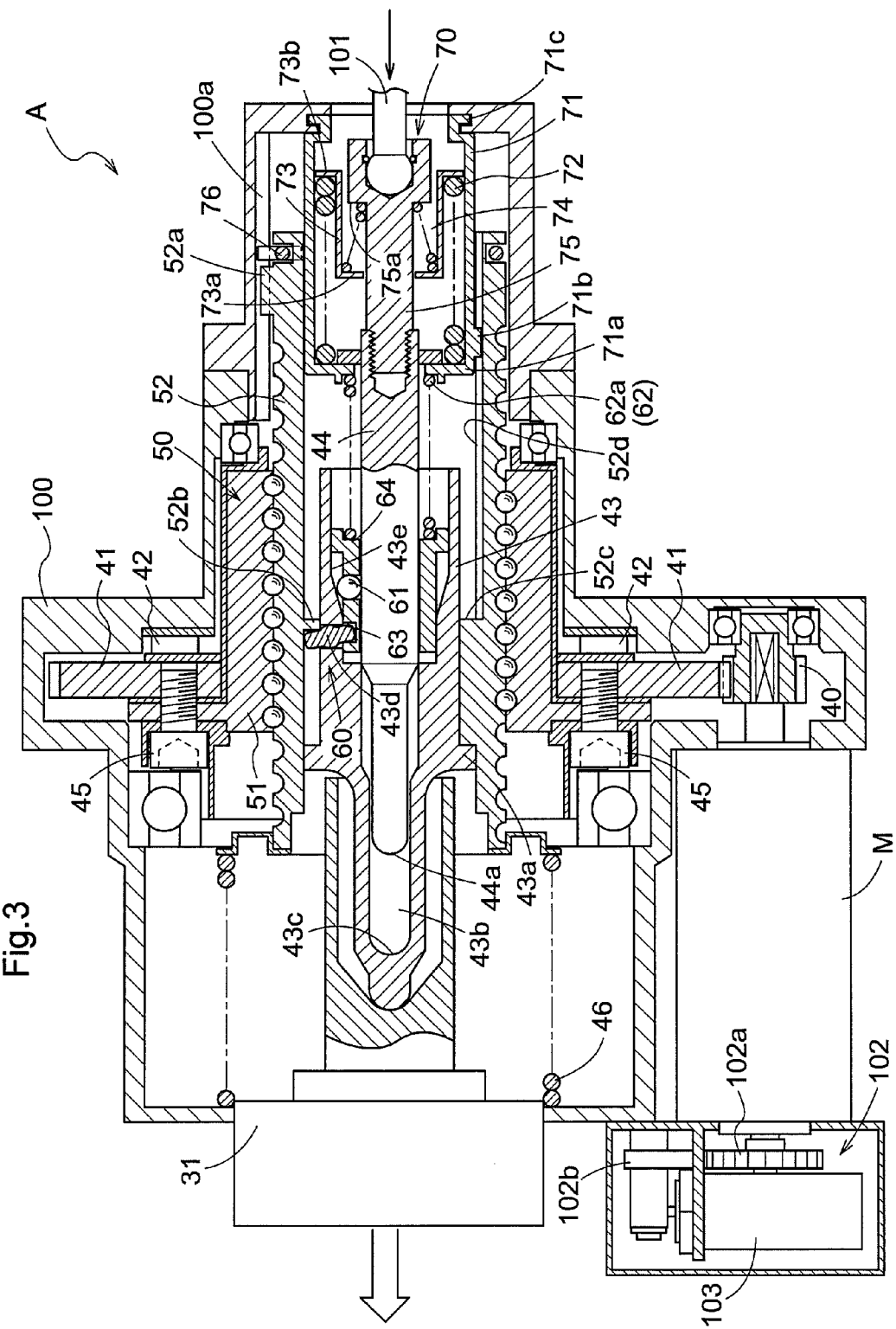
FIG. 3 is a cross section of the pressurizing mechanism when a motor is normally actuated during a brake operation.

Hereinbelow, an operation of the braking device of the present invention will be described when the motor M is normally actuated. FIG. 3 is a cross section of the pressurizing mechanism A, during the operation of the brake pedal BP by a driver.

First, when the brake pedal BP is depressed by a driver, a stroke amount and/or a tread force are measured by the brake operation sensor BS. The measured value is sent from the brake operation sensor BS to the ECU. In order to generate a braking force in accordance with the measured value, the ECU that has received the measured value controls the motor driver MD so that a current in accordance with the measured value is applied to the pressurizing mechanism A. In this case, it is preferable to prepare in advance a table of the operation amount of the brake and a magnitude of current/voltage to be applied, since the amount of the current or the like can be determined without calculation or the like.

The motor M of the pressurizing mechanism A, to which a current is applied by the motor driver MD, rotates in accordance with the applied current. Since the small spur gear 40 rotates uniformly with the rotary shaft of the motor M as described above, the small spur gear 40 rotates by the same amount as the motor M does. In this situation, along with the rotation of the small spur gear 40, the large spur gear 41 that has the cogs capable of engaging with the cogs of the small spur gear 40 also rotates. As described above, since the cog number of the large spur gear 41 is larger than the cog number of the small spur gear 40, these can function as a speed reduction mechanism.

In addition, as described above, the rotational member 51 is rotatable uniformly with the large spur gear 41 and is restricted in the reciprocating direction. Therefore, the rotational member 51 rotates by the same amount as the large spur gear 41 does. Further, since the groove formed in the inner wall of the rotational member 51 and the groove formed in the outer face of the linearly-moving member 52 screw with each other, the linearly-moving member 52 also begins to rotate as the rotational member 51 rotates. When the linearly-moving member 52 rotates in a small amount, the thrust engaging part 52a of the linearly-moving member 52 is brought into contact with the rotation regulating part 100a of the housing 100, by which the rotation of the linearly-moving member 52 is restricted. In this situation, as described above, the first casing 71 of the stroke simulator 70 also rotates and the first casing 71 is locked to the housing 100. With this configuration, the stroke simulator 70 is allowed to generate a reaction force in response to the depression of the brake pedal BP by a driver. Afterward, along with the rotation of the rotational member 51, the linearly-moving member 52 advances while compressing the elastic member 46.

When the linearly-moving member 52 begins to advance, a gap between the thrust transfer part 52c of the linearly-moving member 52 and the thrust receiving part 43a of the output piston 43 narrows. Afterward, the output piston 43 receives a thrust force of the advancing linearly-moving member 52 through the thrust transfer part 52c and the thrust receiving part 43a, and advances together with the linearly-moving member 52.

In this situation, a front end portion of the output piston 43 pushes the end portion of the master piston 31 extending into the pressurizing mechanism A. Accordingly, a fluid pressure inside the hydraulic circuit 10 is increased, and the wheel cylinder WC exerts a braking force on the wheel W by the fluid pressure.

Figure 5A:
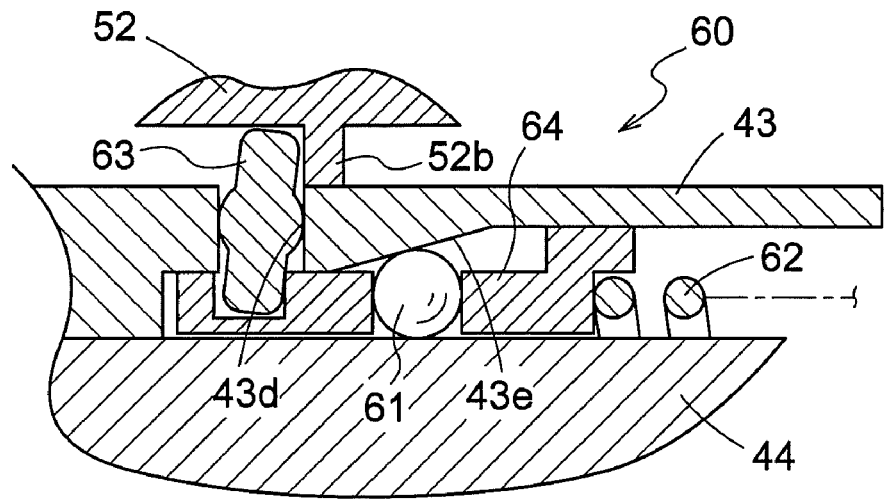
FIG. 5A is a diagram showing a connection state of a clutch mechanism.
Figure 5B:
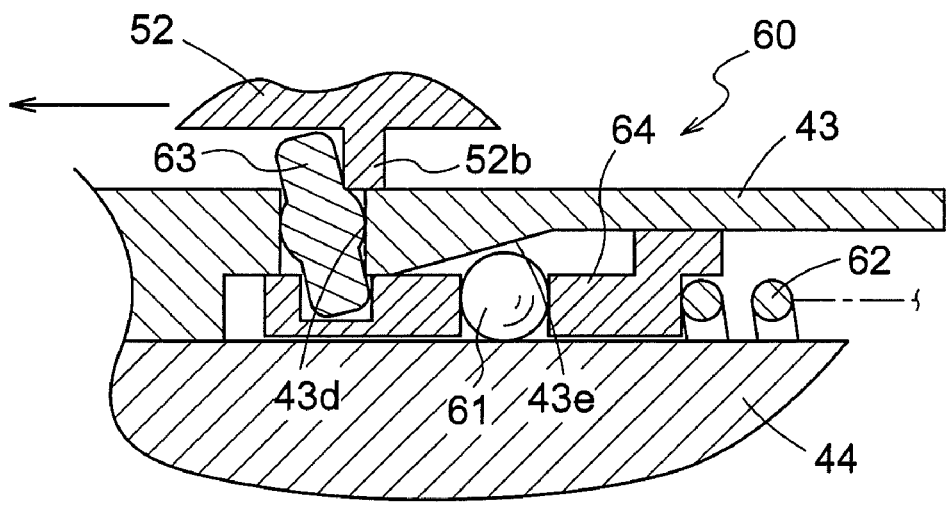
FIG. 5B is a diagram showing a connection state of a clutch mechanism.

The action of the clutch mechanism 60 in this situation is shown in FIG. 5B. When the linearly-moving member 52 begins to advance, the projection 52b provided on the linearly-moving member 52 presses an end portion of the link member 63 protruding on the linearly-moving member 52 side, in the advancing direction. Accordingly, the other end portion opposite to the pressed end portion of the link member 63 swings in a retracting direction. This swing of the link member 63 exceeds a bias force of the biasing element 62, and the rolling element 61 is allowed to move away from the tapered face 43e. Accordingly, the connection of the input rod 44 and the output piston 43 is cancelled, and the input rod 44 and the output piston 43 can advance independently of each other.

With this configuration, an appropriate reaction force is brought to a driver while the brake-by-wire is realized.

In addition, as is apparent from FIG. 3, when the brake operation is performed, a gap is generated between the end wall 43c of the cavity 43b of the output piston 43 and the end portion 44a of the input rod 44. With this gap, even when a regenerative control, an ABS (Anti-lock Brake System) control or the like is performed, the end wall 43c can be prevented from pushing the end portion 44a. In other words, even when a regenerative control, an ABS control or the like is performed, a reaction force transmitted from the master piston 31 to the output piston 43 is never transmitted to the input rod 44, or conversely, a thrust force of the input rod 44 is never transmitted to the master piston 31 through the output piston 43. With this configuration, an operational feeling of a driver is never spoiled which may otherwise be caused by an unnecessary reaction force brought to a driver, and an optimal regenerative control is never spoiled which may otherwise be caused by a transmission of the operation force by a driver.

[Operation when the Motor is not Normally Actuated]

Figure 4:
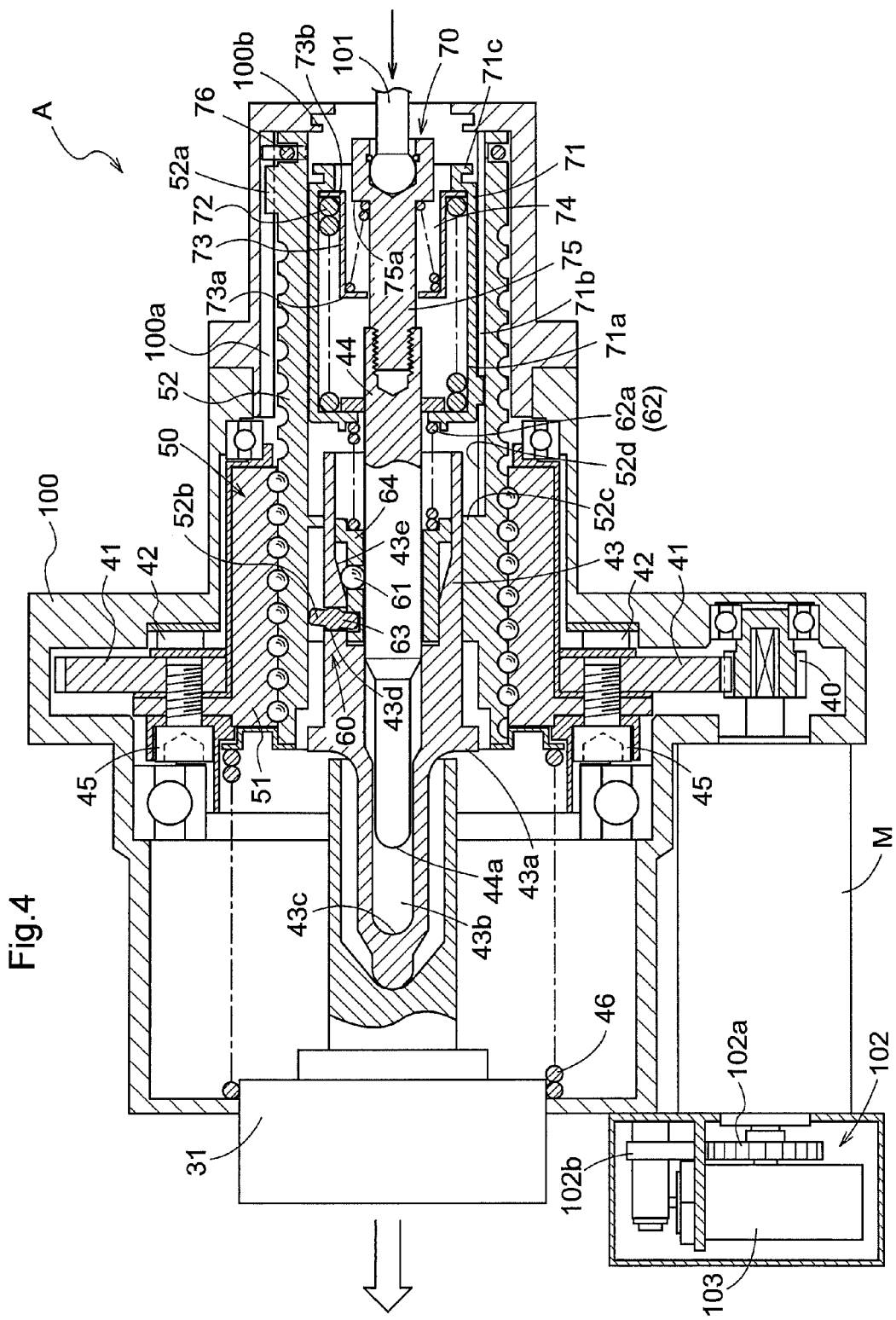
FIG. 4 is a cross section of the pressurizing mechanism when a motor is not normally actuated during a brake operation.

FIG. 4 is a cross section of the pressurizing mechanism A when the brake operation is operated but the motor M is not actuated.

First, when the brake pedal BP is depressed by a driver, an operation amount of the brake pedal BP is measured by the brake operation sensor BS and sent to the ECU. The ECU applies a current in accordance with the measured value to the pressurizing mechanism A through the motor driver MD, though the motor M does not rotate.

In this case, as shown in FIG. 6A, since the engagement between the first casing 71 and the housing 100 is cancelled due to a bias force of the torsion spring 76, the stroke simulator 70 is allowed to advance.

In the present embodiment, an initial load of the biasing element 62 is set larger than that of the second elastic member 74. Therefore, when the shaft 101 advances in accordance with the depression of the brake pedal BP, first the second elastic member 74 begins to contract, and afterward the first casing 71 of the stroke simulator 70 begins to advance. If the actuation of the motor M delays merely due to the time lag or the like and the actuation of the motor M is initiated before the first casing 71 of the stroke simulator 70 advances, the rotation brings the first casing 71 into a locking state with the housing 100, which enables the normal operation as described above.

In addition, when the motor M fails to rotate but the input rod 44 begins to advance, as shown in FIG. 5A, due to a bias force of the biasing element 62, the rolling element 61 is biased to the tapered face 43e and the outer face of the input rod 44, by which a connected state of the input rod 44 and the output piston 43 is retained. Accordingly, an advancing force of the shaft 101 is transmitted to the input rod 44, and the output piston 43 connected to the input rod 44 through the clutch mechanism 60 advances together with the input rod 44.

In this situation, the front end portion of the output piston 43 pushes the master piston 31 and the pressure of the brake oil can be increased.

In this manner, when the motor M fails to be normally actuated, a treading force on the brake pedal BP is directly transmitted to the output piston 43, and the pressure of the brake fluid can be increased. In addition, since the stroke simulator 70 is disconnected from the housing 100 and advances uniformly with the input rod 44, the stroke simulator 70 never generates a reaction force. In other words, a driver receives only a reaction force of the braking oil generated during the advance of the master piston 31, and all of the operation force on the brake pedal BP can be converted into a braking force of the brake.

Second Embodiment

In the embodiment described above, when the braking device is not actuated, the input rod 44 and the output piston 43 are in a connected state by the function of the clutch mechanism 60. In addition, when the brake operation of emergency or the like is performed, the actuation of the motor M may delay behind the brake operation. In this case, the input rod 44 and the output piston 43 are in a connected state through the clutch mechanism 60, and the stroke simulator 70 is not locked to the housing 100. When the motor M is driven after the advance of the input rod 44, the connection of the input rod 44 and the output piston 43 is cancelled by the clutch mechanism 60. However, since the stroke simulator 70 is not locked to the housing 100, a reaction force is not generated, and an uncomfortable feeling is brought to a driver at this time point. The above-described configuration is provided for solving such a problem, but alternatively, the following control can be preformed in the present embodiment.

In the present embodiment, under a condition where no brake operation is performed, the control unit B applies a predetermined current to the motor M and disconnects the input rod 44 and the output piston 43 from each other by the clutch mechanism 60. The predetermined current means a current with a sufficient magnitude to allow the linearly-moving member 52 to advance and the projection 52b to swing the link member 63. In this situation, the stroke simulator 70 is locked to the housing 100 due to the rotation of the linearly-moving member 52. As a result, the braking device can function as that of a brake-by-wire type as soon as the brake pedal BP is depressed.

The amount of current required for the control described above can be attained by measuring an amount of current applied to the motor. Alternatively, it can be attained by measuring the fluid pressure of the master cylinder 30. In this case, it is configured that a gap between the thrust transfer part 52c of the linearly-moving member 52 and the thrust receiving part 43a of the output piston 43 vanishes, as soon as the disconnection by the clutch mechanism 60 is performed. With this configuration, when the linearly-moving member 52 advances a distance that is more than zeroing the gap with the thrust receiving part 43a of the output piston 43, the fluid pressure of the master cylinder 30 begins to increase, and thus a current obtained until a time point at which the fluid pressure of the master cylinder 30 begins to rise can be set as the predetermined current described above.

After performing the control as described above, since the input rod 44 and the output piston 43 are disconnected from each other and the stroke simulator 70 is locked to the housing 100, a trouble may occur in the brake operation after the control described above, when the motor M becomes out of order. However in the braking device of the present invention, even if the motor M becomes out of order immediately after the control described above, zeroing the torque of the motor M leads to the retraction of the linearly-moving member 52 by a bias force of the elastic member 46, which also zeros a thrust force of the projection 52b acting on the link member 63. As a result, the clutch mechanism 60 connects the input rod 44 and the output piston 43. In addition, a bias force of the torsion spring 76 cancels the engagement of the first casing 71 with the housing 100. Accordingly, the desired brake operation of an emergency becomes possible. Therefore, no problem arises even when the motor M becomes out of order after the control described above.

Since the control described above requires a current, unnecessary power is consumed when an unnecessary control is performed. Therefore, it is desirable that the control described above is performed at a time point when the brake operation is predicted. For this purpose, the ECU functions as brake operation prediction means. In this situation, various sensors or the like (not shown) are connected to the ECU. Examples include a speed sensor for measuring a vehicle speed, an acceleration sensor for measuring an acceleration of the vehicle, an accelerator operation sensor for measuring an operation amount of the accelerator, a distance sensor for measuring a distance from a vehicle running in front, and a camera for obtaining images around the vehicle.

For example, the brake operation can be predicted by the cancellation of a tread force on an accelerator pedal (not shown), using the accelerator operation sensor. Further, more precise brake operation can be predicted by taking the speed of the cancellation of the tread force on the accelerator pedal into account, since a foot is momentarily released from the accelerator pedal for performing the brake operation of an emergency. Alternatively, it can be determined that the brake operation will be performed, when a distance from the vehicle running in front becomes a predetermined value or less, by measuring the distance using an input from the distance sensor, camera or the like.

The EUC is configured to determine a possibility of performing a brake operation, based on inputs from these sensors or the like. When it is determined that the brake operation will be performed, the predetermined current described above is applied to the motor M through the motor driver MD. Accordingly, while suppressing an unnecessary consumption of power, an appropriate brake operation can be performed.

Third Embodiment

Figure 7:
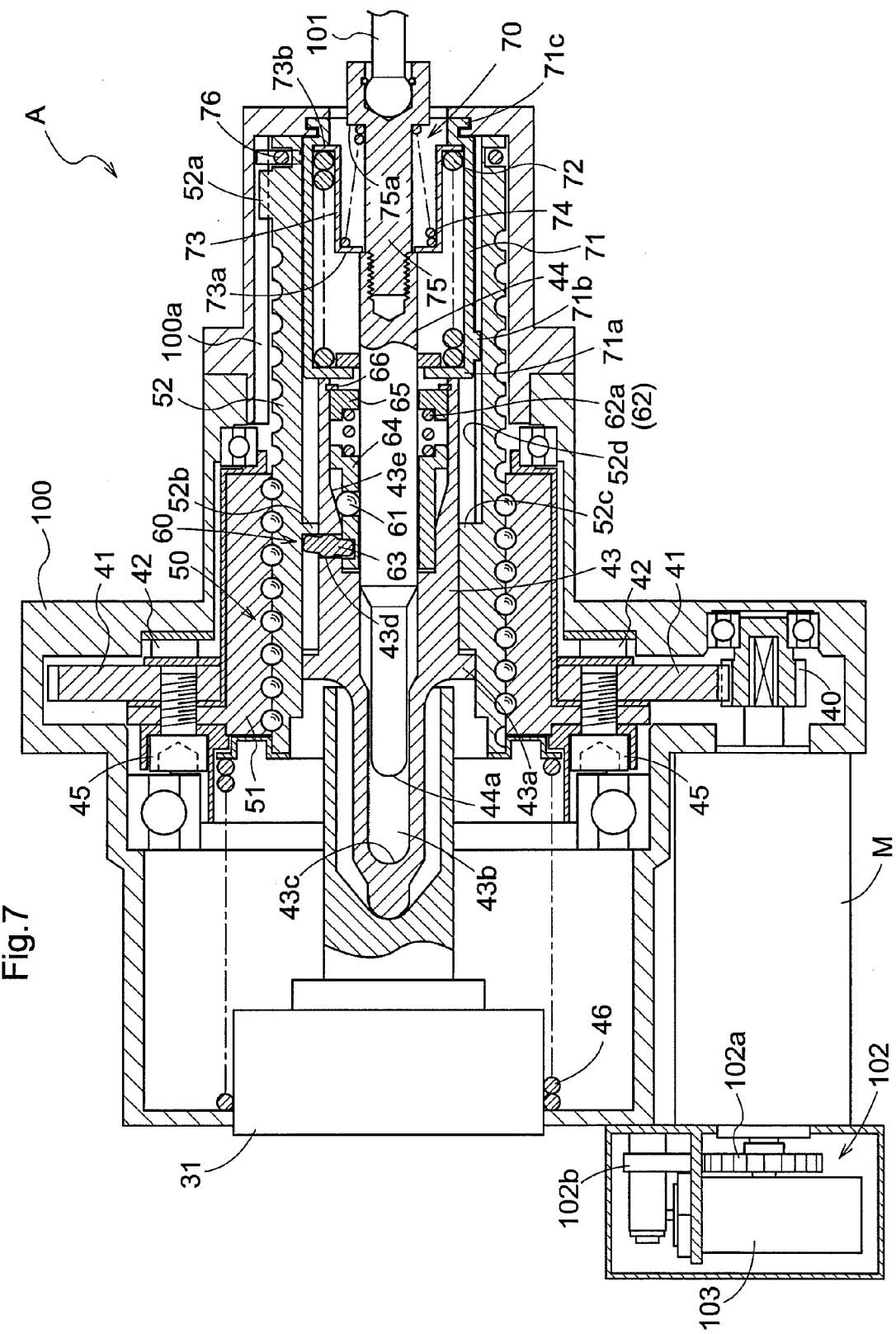
FIG. 7 is a cross section of a pressurizing mechanism of a braking device according to a third embodiment.

In the embodiment described above, the biasing element 62 of the clutch mechanism 60 is fixed to the end wall 71a of the first casing 71. However, as shown in FIG. 7, a fixed member 65 may be present on the stroke simulator 70 side relative to the biasing element 62. The fixed member 65 is fixed to the other end of the output piston 43 by a fixing ring 66. In this configuration, the biasing element 62 is pinched between the fixed members 64 and 65 in a compressed state, and thus exerts forces in a stretching direction on both the fixed members 64 and 65. The force on the fixed member 64 serves as a force that biases the rolling element 61 to the tapered face 43e. On the other hand, the force on the fixed member 65 is cancelled out by a reaction force from the fixing ring 66. As a result, it becomes unnecessary to set an initial load of a return spring (not shown) in the master piston 31 to an initial load of the biasing element 62 or more, and thus the tread force during the depression of the brake pedal BP can be retained small, unlike the embodiment described above.

Fourth Embodiment

Figure 8:
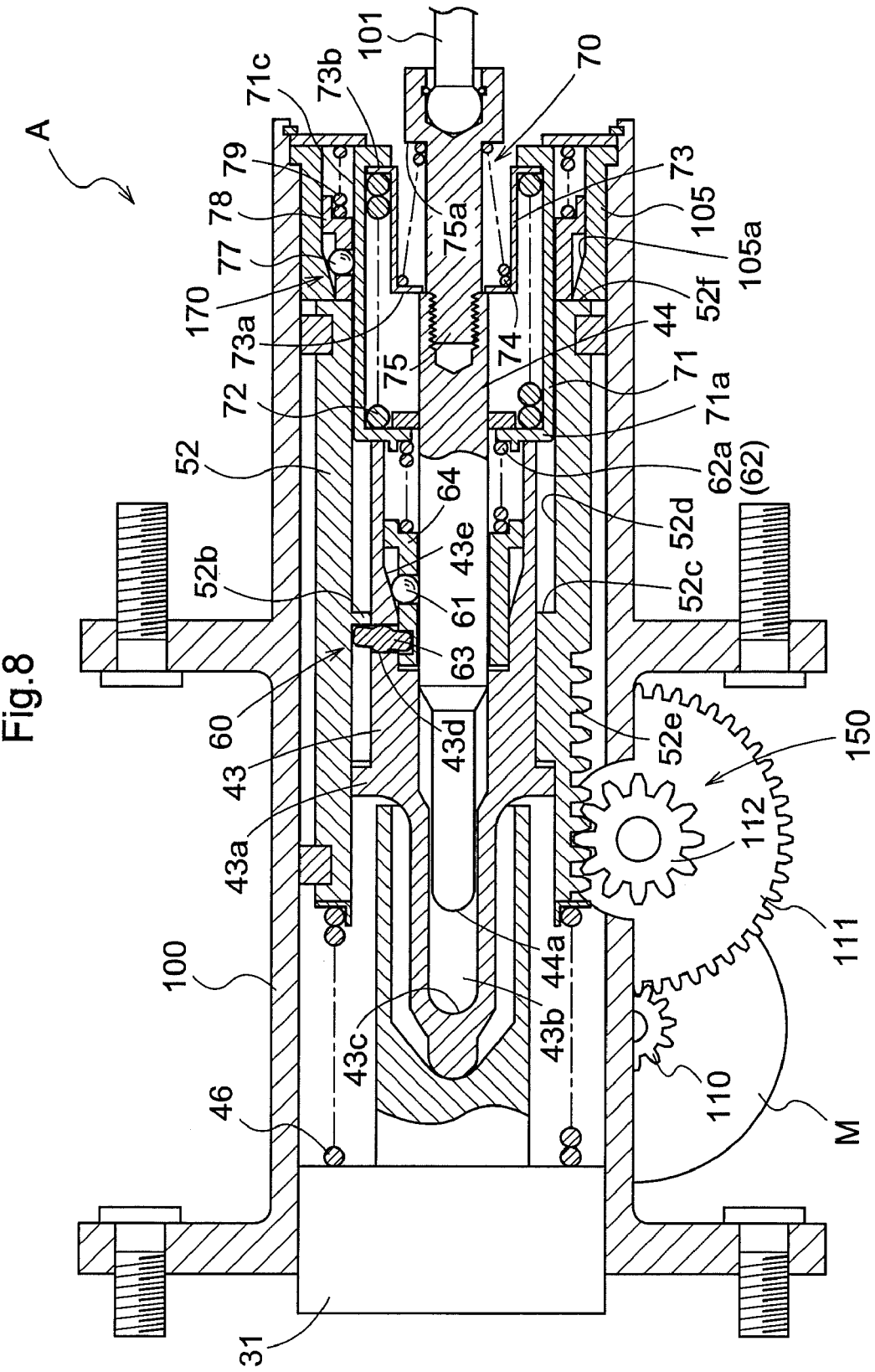
FIG. 8 is a cross section of a pressurizing mechanism of a braking device according to a fourth embodiment.
Figure 9A:
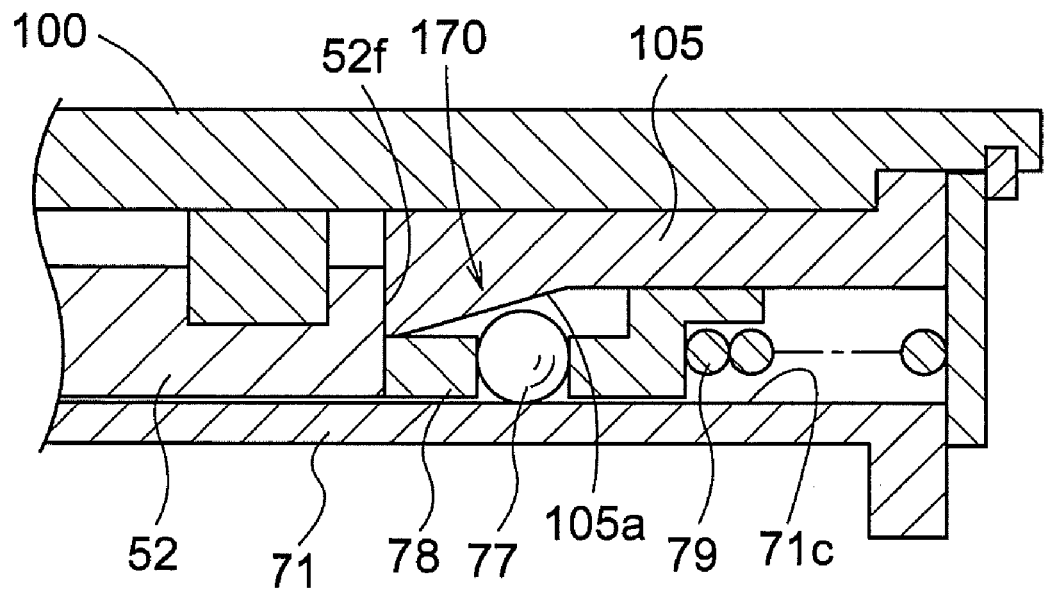
FIG. 9A is a diagram showing a connection state of a clutch mechanism of a stroke simulator.

With reference to FIGS. 8 and 9, a braking device according to the present embodiment will be described. Components which are the same as or similar to those illustrated in the embodiments described above are designated with the same reference characters, and thus a duplicate description is omitted.

FIG. 8 shows a configuration of the pressurizing mechanism A according to the present embodiment. Like the embodiment described above, the pressurizing mechanism A includes: the motor M rotatable in accordance with an applied current from the control unit B; and a small spur gear 110 rotatable uniformly with the rotary shaft of the motor M. However, unlike the embodiment described above, the rotary shaft of the motor M is oriented in a direction orthogonal to the reciprocating direction of the master piston 31. The pressurizing mechanism A further includes: a large spur gear 111 having cogs capable of engaging with cogs of the small spur gear 110, with a cog number of the large spur gear 111 being larger than that of the small spur gear 110; and a pinion gear 112 which is coaxially with the large spur gear 111 and rotatable uniformly with the large spur gear 111.

On the other hand, in the linearly-moving member 52, a rack gear 52e is formed which is engageable with the pinion gear 112. Accordingly, a rotational force of the motor M is transmitted to the rack gear 52e through the small spur gear 110, the large spur gear 111 and the pinion gear 112, and converted into a linear motion force of the linearly-moving member 52. Therefore, the pinion gear 112 and the rack gear 52e (the linearly-moving member 52) form a linear motion conversion mechanism 150 according to the present embodiment. In this manner, in the linear motion conversion mechanism 150 according to the present embodiment, a rotational force of the motor M is converted into a linear motion force of the linearly-moving member 52 utilizing a rack-and-pinion mechanism. Accordingly, as compared with a ball screw mechanism, merits can be provided, such as cost reduction, tranquility and easiness in assembling.

In addition, like the embodiment described above, the pressurizing mechanism A according to the present embodiment includes: the output piston 43 which is inserted into the linearly-moving member 52 and movable in the reciprocating direction of the master piston 31; and the input rod 44, and is connected to the brake pedal BP through the shaft 101. The input rod 44 which is movable in the reciprocating direction of the master piston 31 in accordance with the operation amount of the brake pedal BP further includes: the stroke simulator 70 configured to generate a reaction force in the brake pedal BP in accordance with a reciprocation of the input rod 44; the elastic member 46 configured to bias the input rod 44 and the linear motion conversion mechanism 150 in the retracting direction of the master piston 31; and the clutch mechanism 60 configured to perform connection and disconnection between the input rod 44 and the output piston 43 in accordance with a driving state of the motor M. It should be noted that these components are the same as those illustrated in the embodiments described above, and the operations after the linear motion of the linearly-moving member 52 by the brake operation are the same as those illustrated in the embodiments described above, and thus a duplicate description is omitted.

In the first embodiment and the like described above, the linearly-moving member 52 rotates slightly by the rotation of the motor M, and utilizing the slight rotation, the connection and disconnection between the stroke simulator 70 and the housing 100 are controlled. However, in the present embodiment, there is no slight rotation of the linearly-moving member 52, and by utilizing a clutch mechanism 170 (which is one embodiment of the second clutch mechanism of the present invention) which will be described below, the connection and disconnection between the stroke simulator 70 and the housing 100 is realized. It should be noted that the configuration of the stroke simulator 70 is the same as one in the embodiment described above.

The clutch mechanism 170 according to the present embodiment includes: a tapered face 105a (which is one embodiment of the second tapered face of the present invention) formed in an inner face of a housing inner member 105 which is fixedly provided inside the housing 100; a rolling element 77 (which is one embodiment of the second rolling element of the present invention) disposed between the tapered face 105a and an outer face 71c of the first casing 71 of the stroke simulator 70; a fixed member 78 configured to limit the movement of the rolling element 77 in a reciprocating direction; a biasing element 79 (which is one embodiment of the second biasing element of the present invention) configured to bias the rolling element 77 in the advancing direction through the fixed member 78; and an end face 52f of the linearly-moving member 52 on a retracting direction side. It should be noted that, in the drawing, the single rolling element 77 is illustrated, but the number of the rolling element 77 may be appropriately selected.

Figure 9B:
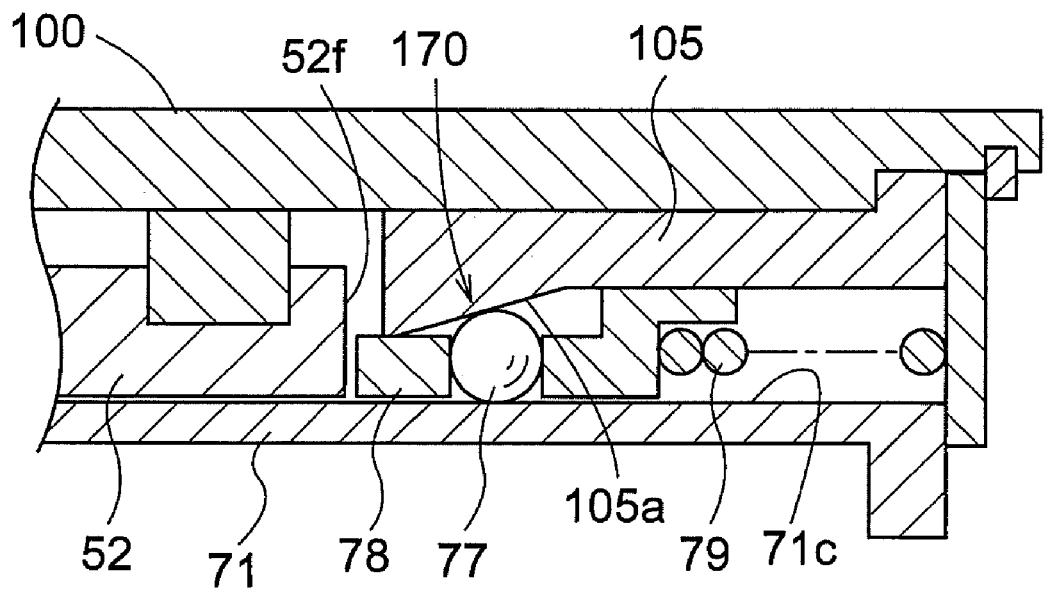
FIG. 9B is a diagram showing a connection state of a clutch mechanism of a stroke simulator.

FIG. 9B is an enlarged view of the clutch mechanism 170 in a state where the motor M is driven by the brake operation and the linearly-moving member 52 moves slightly (a distance that is sufficient for the clutch mechanism 60 to be detached) in an advancing direction. In this state, a contact between the end face 52f of the linearly-moving member 52 and the fixed member 78 is cancelled. Therefore, the fixed member 78 is biased in the advancing direction by a bias force of the biasing element 79. Since the movement of the rolling element 77 in the reciprocating direction is restricted by the fixed member 78, as the fixed member 78 is biased in the advancing direction, the rolling element 77 is also biased in the advancing direction, and is brought into contact with both the tapered face 105a and the outer face 71c of the first casing 71. Due to this contact with the rolling element 77, the connection of the housing 100 and the first casing 71, i.e., the stroke simulator 70 is realized. Therefore, when the motor M is normally actuated, the clutch mechanism 170 connects the stroke simulator 70 and the housing 100, and thus the stroke simulator 70 can exert a reaction force on the shaft 101. It should be noted that, as shown in FIG. 9B, in a state where the stroke simulator 70 and the housing 100 are connected, an end portion of the fixed member 78 on an advancing side protrudes from an end portion of the housing inner member 105 on the advancing side.

On the other hand, when a tread force on the brake pedal BP is cancelled, the motor M rotates in a reverse direction to the direction described above, and the linearly-moving member 52 moves in the retracting direction. Due to this movement of the linearly-moving member 52, the end face 52f of the linearly-moving member 52 is brought into contact with the end portion of the fixed member 78 on the advancing side, and the linearly-moving member 52 continues moving in the retracting direction, to an initial position of the linearly-moving member 52 (at which no driving force is transmitted from the motor M). In this state, a pressing force of the linearly-moving member 52 exceeds a bias force on the fixed member 78 of the biasing element 79, which allows the biasing element 79 to be compressed. As a result, the rolling element 77 is detached from the tapered face 105a, and the stroke simulator 70 is disconnected from the housing 100 (see FIG. 9A).

As described above, in a state where a driving force of the motor M is not transmitted to the linearly-moving member 52, due to the action of the clutch mechanism 170, the stroke simulator 70 is disconnected from the housing 100. In this situation, when a brake operation is operated on the brake pedal BP and the motor M is normally actuated, as described above, along with the movement of the linearly-moving member 52, the stroke simulator 70 and the housing 100 are connected due to the function of the clutch mechanism 170, and thus a reaction force can be transmitted to the brake pedal BP through the shaft 101. On the other hand, when the motor M is not actuated in response to the brake operation, since the stroke simulator 70 in a detached state moves in the advancing direction in accordance with a tread force on the brake pedal BP, only a reaction force by the master piston 31 is transmitted to the brake pedal BP.

It should be noted that the clutch mechanism 170 can be applied not only to the pressurizing mechanism A using a rack-and-pinion mechanism, but also to the pressurizing mechanism A using a ball screw mechanism as in the embodiments described above.

The invention claimed is:

1. A braking device comprising:
    an input member configured to interlock with a displacement of a brake pedal;
    an output member which is movable relatively to and independently of the input member and is configured to generate a fluid pressure in a master cylinder;
    a braking mechanism configured to exert a braking force on a wheel by the fluid pressure generated in the master cylinder;
    drive means configured to drive the output member independently of the input member; and
    a clutch mechanism which is provided between the input member and the output member and configured to engage the input member with the output member so as to allow the input member and the output member to uniformly move when the output member is not driven by the drive means, and to cancel the engagement between the input member and the output member when the output member is driven by the drive means.

2. The braking device according to claim 1 further comprising:
    a housing configured to hold the input member and the output member therein,
    wherein the drive means comprises:
        a motor;
        a rotational member which is provided in the housing and rotatable while a reciprocation thereof is restricted in accordance with a rotation of the motor; and
        a linearly-moving member which is engageable with the rotational member, reciprocative in a moving direction of a master piston provided in the master cylinder in accordance with a rotation of the rotational member, and configured to exert a thrust force in an advancing direction of the master piston on the output member.

3. The braking device according to claim 2, wherein the clutch mechanism comprises:
    a tapered face formed in an inner face of the output member;
    a rolling element disposed between the tapered face and an outer face of the input member;
    a biasing element configured to bias the rolling element in a direction that brings the rolling element into contact with the tapered face and the outer face of the input member; and
    a link member which is inserted into an opening formed in a side face of the output member, protrudes on both a linearly-moving member side and an input member side, and is swingable so as to press the rolling element in a direction opposite to the direction that brings the rolling element into contact, along with a movement of the linearly-moving member to a master piston side.

4. The braking device according to claim 3, further comprising a stroke simulator,
which is provided in a transmission system configured to transmit an operational force on the brake pedal to the input member, and
which is configured to exert a reaction force on the brake pedal in accordance with an operational amount of the brake pedal.

5. The braking device according to claim 4, wherein:
the linearly-moving member is slightly rotatable by an initial rotation of the motor,
the stroke simulator comprises: an engaging portion engageable with the housing; and a thrust engaging part thrustwise-engageable with the linearly-moving member, and
the engaging portion does not engage with the housing when a current is not applied to the motor, and engages with the housing by a rotational force received from the linearly-moving member through the thrust engaging part when the motor is driven.

6. The braking device according to claim 5, wherein
of two end portions of the biasing element of the clutch mechanism, an end portion opposite to an end portion on a rolling element side is brought into contact with an end wall of the stroke simulator on a master cylinder side.

7. The braking device according to claim 4, further comprising:
a second clutch mechanism comprising:
a second tapered face formed in an inner face of a member provided in the housing;
a second rolling element disposed between the second tapered face and an outer face of the stroke simulator; and
a second biasing element configured to bias the second rolling element in a direction that brings the second rolling element into contact with the second tapered face and the outer face of the stroke simulator;
the second clutch mechanism being configured to press the second rolling element in a direction opposite to the direction that brings the second rolling element into contact, along with a movement of the linearly-moving member away from the master piston.

8. The braking device according to claim 7, wherein of two end portions of the biasing element of the clutch mechanism, an end portion opposite to an end portion on a rolling element side is brought into contact with an end wall of the stroke simulator on a master cylinder side.

9. The braking device according to claim 1, further comprising a control unit configured to apply a current to the motor required for canceling the engagement of the clutch mechanism when the brake pedal is not operated.

* * * * *